(12) United States Patent
Guarnieri et al.

(10) Patent No.: US 8,943,599 B2
(45) Date of Patent: *Jan. 27, 2015

(54) CERTIFYING SERVER SIDE WEB APPLICATIONS AGAINST SECURITY VULNERABILITIES

(71) Applicant: International Business Machines Corporation, Armonk, NY (US)

(72) Inventors: Salvatore A. Guarnieri, New York, NY (US); Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/650,831

(22) Filed: Oct. 12, 2012

(65) Prior Publication Data

US 2014/0082736 A1 Mar. 20, 2014

Related U.S. Application Data

(63) Continuation of application No. 13/622,161, filed on Sep. 18, 2012.

(51) Int. Cl.
*G06F 21/00* (2013.01)
*H04L 29/06* (2006.01)
*G06F 21/57* (2013.01)

(52) U.S. Cl.
CPC .......... *H04L 63/1433* (2013.01); *H04L 63/107* (2013.01); *G06F 21/577* (2013.01); *H04L 63/16* (2013.01); *H04L 63/20* (2013.01)

USPC .............................................. 726/25; 726/22

(58) Field of Classification Search
CPC ... H04L 63/1433; H04L 63/107; H04L 63/16; H04L 63/20; G06F 21/577
USPC ....................................................... 726/22, 25
See application file for complete search history.

(56) References Cited

U.S. PATENT DOCUMENTS

| | | | |
|---|---|---|---|
| 6,530,022 B1 * | 3/2003 | Blair et al. ..................... | 713/186 |
| 7,237,265 B2 | 6/2007 | Reshef et al. | |
| 7,340,776 B2 * | 3/2008 | Zobel et al. ..................... | 726/24 |
| 7,761,918 B2 | 7/2010 | Gula et al. | |
| 8,019,990 B2 | 9/2011 | Chang | |

(Continued)

OTHER PUBLICATIONS

Comodo CA Limited. "About HackerProof" Jul. 2011. (1 Page) http://www.comodo.com/hackerproof/what_hackerproof_includes.html.

(Continued)

*Primary Examiner* — Jung Kim
*Assistant Examiner* — Ayoub Alata
(74) *Attorney, Agent, or Firm* — Tutunjian & Bitetto, P.C.; Anne V. Dougherty

(57) ABSTRACT

Systems for server security verification include a report validation module configured to acquire a public key associated with a received report, where the received report was generated at a server, to decrypt the received report using the public key, and to determine a level of server-side security based on the decrypted report; and a processor configured to reconfigure a browser responsive to the determined level of server-side security.

24 Claims, 3 Drawing Sheets

(56) References Cited

U.S. PATENT DOCUMENTS

| | | | |
|---|---|---|---|
| 8,261,354 B2* | 9/2012 | Kline et al. | 726/25 |
| 8,448,241 B1* | 5/2013 | Kadakia | 726/22 |
| 2003/0028803 A1 | 2/2003 | Bunker et al. | |
| 2003/0056116 A1 | 3/2003 | Bunker et al. | |
| 2005/0010821 A1* | 1/2005 | Cooper et al. | 713/201 |
| 2005/0160480 A1* | 7/2005 | Birt et al. | 726/25 |
| 2006/0195588 A1 | 8/2006 | Pennington et al. | |
| 2007/0233854 A1* | 10/2007 | Bukovec et al. | 709/224 |
| 2008/0276295 A1 | 11/2008 | Nair | |
| 2009/0193074 A1 | 7/2009 | Lee | |
| 2011/0161486 A1 | 6/2011 | Podjarny et al. | |
| 2011/0197280 A1 | 8/2011 | Young et al. | |
| 2012/0030460 A1 | 2/2012 | Chang | |
| 2012/0042164 A1 | 2/2012 | Gagnon et al. | |
| 2012/0089672 A1 | 4/2012 | Saillet | |

OTHER PUBLICATIONS

Google Developers. "What is Safe Browsing?" Last updated Apr. 2012. (3 Pages) https://developers.google.com/safe-browsing/.

Isohara, et al.; "SKI: Security Key Infrastructure for a Server Audit Certification", APSITT Proceedings 6th Asia-Pacific Symposium on Information Technology. Nov. 2005. pp. 350-355.

McAfee, Inc. "SiteAdvisory—How It Works" Jul. 2011. (3 pages) http://www.siteadvisor.com/howitworks/index.html.

Shelly, et al.; "Closing The Gap: Analyzing the Limitations of Web Application Vulnerability Scanners", Virginia Polytechnic Institute and State University. OWASP DC 2010. Nov. 2010. pp. 1-42.

Guarnieri, S., et al. "International Search Report and Written Opinion" Patent Cooperation Treaty. Issued for International Application No. PCT/US2013/060360 on Oct. 31, 2013. (13 Pages).

* cited by examiner

CERTIFYING SERVER SIDE WEB APPLICATIONS AGAINST SECURITY VULNERABILITIES

RELATED APPLICATION INFORMATION

This application is a Continuation application of copending U.S. patent application Ser. No. 13/622,161 filed on Sep. 18, 2012, incorporated herein by reference in its entirety.

BACKGROUND

1. Technical Field

The present invention relates to web security certification and, more particularly, to the certification of server-side applications.

2. Description of the Related Art

Web applications, particularly commercial ones, are a target for security attacks. If the web application is vulnerable then, depending on the nature of the vulnerability, an attacker can, e.g., inject scripts that abuse other users of the web application and/or steal their data (e.g., using a cross-site scripting or cross-application request forgery payload) or exploit the server side of the web application (e.g., using a log-forging or command-execution payload). A consumer of the web application or web service is sometimes able to inspect its client side application, either manually or by using an automated scanning tool, but the consumer does not normally have access to the server side of the web application.

This leaves the users of a web application or service without any way to protect themselves from server-side vulnerabilities. Even if the users operate a scanning tool on the client side and find no vulnerabilities, the server side may still process its incoming data in an unsafe way by, e.g., failing to apply proper sanitization/validation in some or all cases. This is particularly the case when the server side is mostly correct in terms of its security enforcement, but nonetheless suffers from a few subtle or hard-to-find vulnerabilities.

Solutions have been developed to boost the user's confidence in a website. Third party scanners embed a "trustmark" in the client side of the website, indicating that the server application has been scanned and found to be safe. The inherent problem remains, however, that external scanners are limited in their ability to expose server-side vulnerabilities. One classic example of such a vulnerability is persistent cross-site scripting, where the payload is not reflected immediately but lies dormant in a backend database for a future user request to retrieve it.

SUMMARY

A method for server security verification is shown that includes acquiring a public key associated with a received report that includes an indication regarding the presence of a vulnerability for each of said one or more vulnerabilities, said report having been generated at a server; decrypting the received report using the public key; determining a level of server-side security based on the decrypted report using a processor; and reconfiguring a browser at the client responsive to the determined level of server-side security.

A further method for server security verification is shown that includes acquiring a public key at a client associated with a received report that includes an indication regarding the presence of a vulnerability for each of said one or more vulnerabilities, said report having been generated at a server; decrypting the received report using the public key; determining a level of server-side security based on the decrypted report using a processor; scanning the server for vulnerabilities using a scanning module located at the client, the scanning module being configured to enhance or diminish scanning of specific vulnerabilities based on the determined level of server-side security; and reconfiguring a browser at the client responsive to the determined level of server-side security.

A further method for server security verification is shown that includes scanning a server for one or more vulnerabilities using a scanning module located at the server; generating an encrypted report of server-side security that includes an indication regarding the presence of a vulnerability for each of said one or more vulnerabilities based on the results of said scanning, said encryption being performed using a private key; decrypting a copy of the encrypted report at a requesting client using a public key; determining a level of server-side security based on the decrypted report using a processor; and scanning the server for vulnerabilities using a scanning module located at the client.

A further method for server security verification is shown that includes scanning a server for one or more vulnerabilities using a scanning module located at the server; generating an encrypted report of server-side security that includes an indication regarding the presence of a vulnerability for each of said one or more vulnerabilities based on the results of said scanning, said encryption being performed using a private key; transmitting the encrypted report to a requesting client; decrypting the encrypted report using a public key; determining a level of server-side security based on the decrypted report using a processor; configuring a scanning module located at the client to increase or diminish scanning of specific vulnerabilities based on the determined level of server-side security; and scanning the server for vulnerabilities using a scanning module located at the client.

A client security module is shown that includes a report validation module configured to acquire a public key associated with a received report, said received report having been generated at a server, to decrypt the received report using the public key, and to determine a level of server-side security based on the decrypted report; and a processor configured to reconfigure a browser responsive to the determined level of server-side security.

A further client security module is shown that includes a report validation module configured to acquire a public key associated with a received report, said received report having been generated at a server and indicating the presence of one or more vulnerabilities at the server, to decrypt the received report using the public key, and to determine a level of server-side security based on the decrypted report; a scanning module configured to scan the server for vulnerabilities based on the received report, wherein the scanning module enhances or diminishes scanning of specific vulnerabilities based on the determined level of server-side security; and a processor configured to reconfigure a browser responsive to the determined level of server-side security and an outcome of the scanning module.

A security verification system is shown that includes a server security module and a client security module. The server security module includes a scanner configured to scan a server for one or more vulnerabilities; a report generator configured to generate an encrypted report of server-side security based on results provided by said scanner; and a transmitter configured to transmit the encrypted report to a requesting client. The client security module includes a report validation module configured to decrypt a received report, said received report having been generated at a server, and to determine a level of server-side security based on the decrypted report using a processor; and a scanning module configured to scan the server for vulnerabilities, said scanning being configured to enhance or diminish scanning of specific vulnerabilities based on the determined level of server-side security.

A further security verification system is shown that includes a server security module and a client security module. The server security module includes a scanner configured to scan a server for one or more vulnerabilities; a report generator configured to generate a private key encrypted report of server-side security that includes an indication regarding the presence of a vulnerability for each of said one or more vulnerabilities using a processor, and further configured to publish a public key corresponding to the private key; and a transmitter configured to transmit the encrypted report to a requesting client, such that the client can access the encrypted report using the public key to determine a level of server-side security. The client security module includes a report validation module configured to acquire a public key associated with a received report, said received report having been generated at a server, to decrypt the received report using the public key, and to determine a level of server-side security based on the decrypted report using a processor; and a scanning module configured to scan the server for vulnerabilities, said scanning being configured to enhance or diminish scanning of specific vulnerabilities based on the determined level of server-side security.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide full certification of web applications, including the ability to communicate information from server-side scanning to the client side robustly and reliably. The server-side application performs scanning and produces a report that is available to the client using public key encryption, such that the client can be certain that the report was actually delivered by the appropriate server, rather than a third-party attacker.

The information relating to server-side certification may be rejected or deemed trusted at the client-side using a browser plug-in. The client-side can further produce an online assessment of how secure the site is based on the report and can further initiate guided client-side scanning of the website based on the information in the report.

Figure 1:
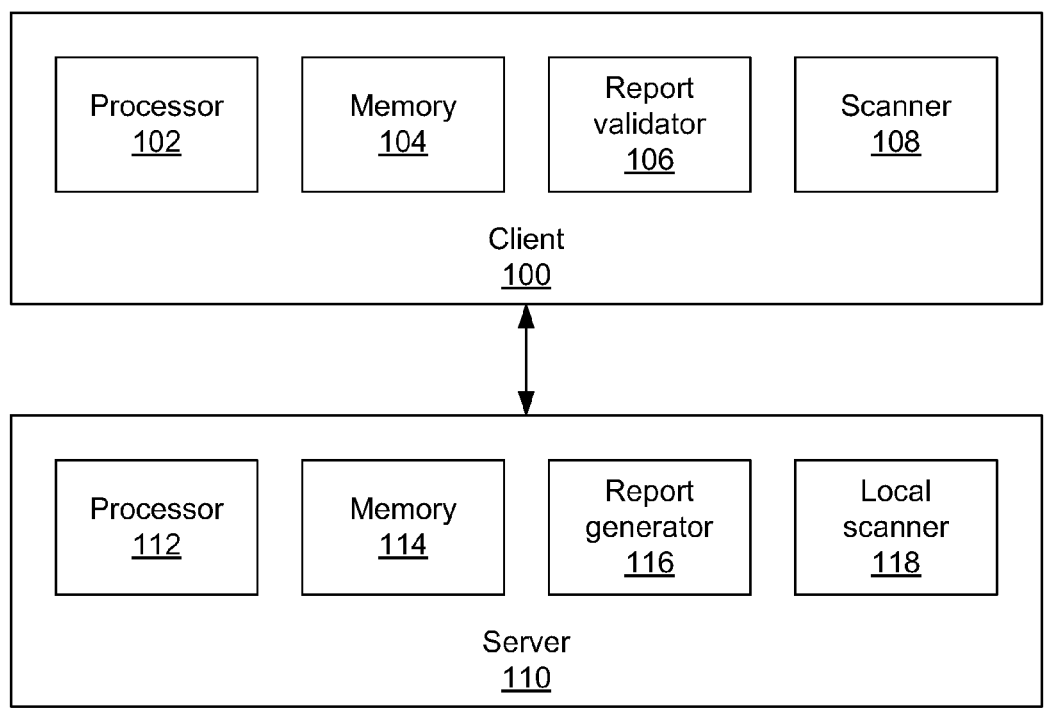
FIG. 1 is a block diagram of a client and a server that perform security analysis according to the present principles.

Referring now to the drawings in which like numerals represent the same or similar elements and initially to FIG. 1, an exemplary network is shown that includes a client 100 and a server 110. The client 100 accesses a service or website on server 110 using, e.g., the Internet or some other appropriate communications medium. The client includes a processor 102 and memory 104 configured to store and execute, e.g., a web browser. Similarly, the server 110 includes a processor 112 and memory 114, which receive requests from the client 100 and provide responses.

The server 110 further includes a local scanner 118 which performs security scanning on the local systems and content. The scanner 118 is configured to seek out vulnerabilities such cross-site scripting at the server 110, which would be difficult to find by third-party scanning, such as by a client-side scanner 108. The scanner 118 may scan the entire server 110 or select web applications or services within the server 110.

The server 110 includes a report generator 116 that creates a report stored in memory 114. The report is encrypted according to, e.g., a private key having a corresponding public key that is published and freely available. If other reports exist in memory 114, then the new report may replace, be merged with, or be added to the preexisting reports.

When the client 100 accesses the server 110, it may request a copy of the report stored in memory 114. After the report is transferred, the client 100 may use a report validator 106 to decrypt the report and either deem the server 110 to be trusted or reject it. The validator 106 can produce an assessment of how secure the site is and further trigger scanner 108 to conduct a client-side scan of the server 110 if needed. The report validator 106 may be formed as part of, e.g., a web browser or web browser plugin. If the report validator 106 fails to open the report, a warning may be generated that indicates, e.g., a forgery attempt by an attacker using cache poisoning. Otherwise, the report becomes available to the client-side user, who can now appreciate the security status of the server 110.

By exporting server-side security reports to client 100 using a trusted communication channel (e.g., public-key authentication), the end user may decide whether to interact with the server 110 or particular web applications or servers therewithin. This can be done directly, by manual review of the report, or using an automated assessment policy embodied in, e.g., a browser plugin. In addition, the information from the server-side report can guide/specialize client-side scanning of the server 110. For example, if the report indicates that the server side is not vulnerable to cross-site scripting attacks, then there is no need for the client-side scanner 108 to attempt such payloads. Similarly, if the report indicates a structured query language (SQL) injection vulnerability at a particular module at the server 110, then the client-side scanner 108 may be configured to invest a larger proportion of its budget in trying to demonstrate this vulnerability than it would have by default. Furthermore, efficiency is improved by decoupling the server- and client-side scanning. The server 110 may be analyzed once and then each client 100 assesses the security status of the entire system (client 100 plus server 110) in a modular fashion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
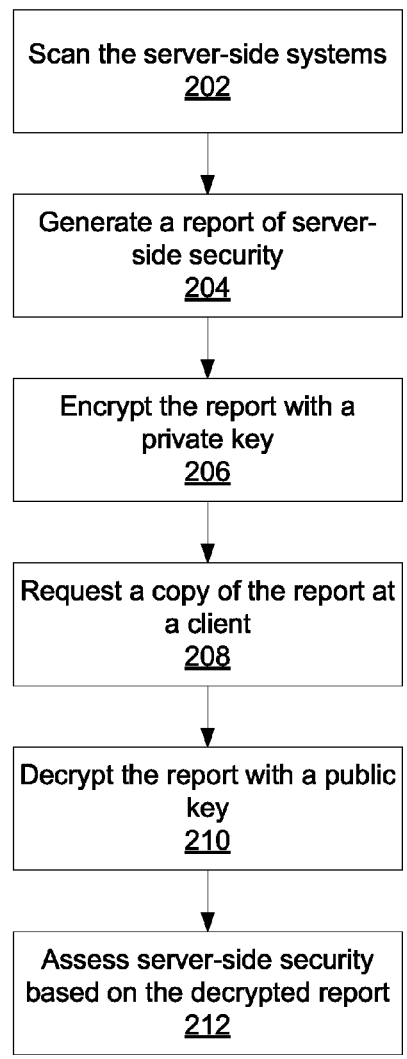
FIG. 2 is a block/flow diagram of a method for determining a level of server-side security according to the present principles.

Referring now to FIG. 2, a method for client-side validation of server-side security is shown. At block 202, the server-side scanner 118 scans the server 110, including specified services and web applications, for security vulnerabilities. At block 204, the report generator 116 generates a report that details the findings of the scanner 118. The report may be human-readable, or may be formatted according to a computer-readable format associated with, e.g., the particular server-side scanner 118 being employed. The report generator 116 encrypts the report with a private key and stores the report in memory 114 at block 206.

The following is an example of a scanning report generated by a real-world implementation of report generator 116.

1) FrikiServlet.java:230 PathTraversal

At FrikiServlet.java line 209 the application reads in an untrusted value and uses it to determine the path of a file operation at line 230.

---
FrikiServlet.java:209 [init] calls getAttribute
  −> 230 calls <init>

---

2) FrikiServlet.java:71 PathTraversal

At FrikiServlet.java line 209 the application reads in an untrusted value and uses it to determine the path of a file operation at line 71.

---
FrikiServlet.java:209 [init] calls getAttribute
  −> 231
  −> 176 [setRedirect]
  −> 180
  −> 187 [setBaseDir]

-continued

```
-> 190
-> 202
-> 61 [setPolicy]
-> 62
-> 63
-> 69 [resetPolicy]
-> 71 calls <init>
```

3) FrikiServlet.java:194 PathTraversal

At FrikiServlet.java line 401 the application reads in an untrusted parameter value and uses it to determine the path of a file operation at FileUtils.java line 18.

```
FrikiServlet.java:401 [unconfigured] calls getParameter
    -> 404
    -> 187 [setBaseDir]
    -> 194
    -> FileUtils.java:17 [ensureDirectory]
    -> 18 calls <init>
```

Each of the above sets specifies a particular location and type of potential vulnerability in a program, providing contextual information that can be used to determine how severe the vulnerability is.

At block 208, a client 100 requests a copy of the report from server 110. This request may be directed to a particular service or application, or may be directed to the server 110 as a whole. After the report has been transmitted to client 100, the report is decrypted by report validator 106 at block 210. The report validator 106 assesses the server-side security based on the decrypted report at block 212.

Decryption at block 210 takes place according to, e.g., public-key authentication, where the report validator 106 acquires a public key associated with the private key used to encrypt the report. The public key may be stored at the server 110, with the provider of the server-side scanner 118, or with a third-party provider.

Figure 3:
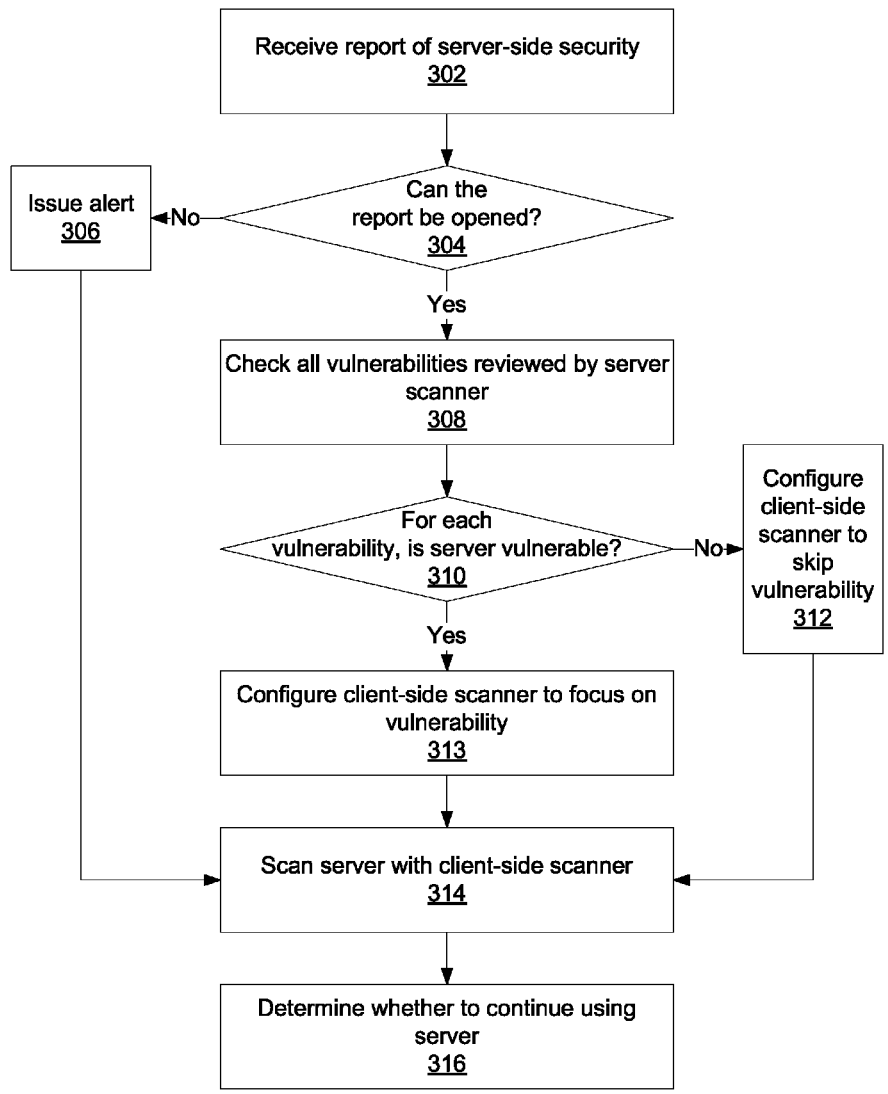
FIG. 3 is a block/flow diagram of a method for configuring a client-side scanner according to the present principles.

Referring now to FIG. 3, a method for performing further scanning based on the receipt of a server-side scanning report is shown. Block 302 performs the method of FIG. 2, accessing a server 100 and retrieving a report produced by the server-side scanner 118. Block 304 determines whether the report can be opened. If not, block 306 issues an alert to the user before proceeding with a scan by client-side scanner 108 at block 314 using default settings. If the report can be opened, block 308 evaluates each of the vulnerabilities checked by the server-side scanner 118.

For each such vulnerability, block 310 determines whether the server-side scanner 118 found a vulnerability. If the server 110 was not vulnerable to a particular attack, block 312 configures the client-side scanner 108 to skip checks for that vulnerability. Alternatively, if the report shows that the server 110 was vulnerable to the attack, block 313 configures the client-side scanner to focus additional resources on demonstrating the vulnerability. This is done because a given finding may be a false positive. Testing whether a vulnerability is real saves the end user the effort of going over many false issues and provides insight into the nature of the problem and steps for reproducing it. Having performed such a configuration for each vulnerability that was checked by the server-side scanner 118, block 314 initiates a client-side scan of the server 110 using scanner 108. Based on the outcome of the received report and the local scan, block 316 determines whether to continue using the server 110. As noted above, this decision can be made manually by the user, or may be automatically implemented according to a security policy.

For example, block 316 may determine that a number or severity of the server's vulnerabilities exceeds a threshold quantity, such that the client's access to the server 110 may be automatically restricted or stopped entirely. Toward this end, different types of vulnerability may be associated with different severity scores, with the sum of the scores being compared to the threshold. Alternatively, a client 100 may provide additional warnings for a user attempting to access a high-risk server 110, in particular notifying the user of any attempt to access services that are known to be vulnerable. This informs the user of the potential risk and allows the user to make informed decisions or to take risk-mitigating actions, such as enabling encryption or using less sensitive information. Multiple thresholds may be used to establish different ranges of vulnerability severity, allowing the user to make a fine-grained choice with respect to whether to use the server 110 and what remediating measures to take.

The remediating measures of block 316 may include, for example, disabling JavaScript®, blocking applications from running, and asking the user whether to proceed. These steps may be performed with or without user intervention, and may alternatively be performed automatically as described above, according to a set of policies that associate particular actions with specific types and severity of vulnerability. Furthermore, a browser plugin can disable some links, or issue a warning when the user attempts to visit certain links, having established that the pages these links lead to are potentially vulnerable. Another possible remediating measure is to block or restrict the execution of Flash components.

Having described preferred embodiments of a system and method for certifying server side web applications against security vulnerabilities (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A client security module, comprising:
   a report validation module configured to acquire a public key associated with a received report, said received report having been generated by a security scan by a server, to decrypt the received report using the public key, and to determine a level of server-side security based on the decrypted report;
   a processor configured to reconfigure a browser responsive to the determined level of server-side security; and
   a scanning module configured to scan the server for vulnerabilities based on the received report.

2. The client security module of claim 1, wherein the received report includes an indication regarding the presence of one or more vulnerabilities at the server.

3. The client security module of claim 1, wherein the scanning module is further configured to enhance or diminish scanning of specific vulnerabilities based on the determined level of server-side security.

4. The client security module of claim 3, wherein the scanning module is further configured to skip scanning of vulnerabilities indicated in the report as not being present at the server.

5. The client security module of claim 3, wherein the scanning module is further configured to increase scanning of vulnerabilities indicated in the report as being present at the server.

6. The client security module of claim 1, wherein the report validation module is further configured to sum severity scores associated with any vulnerabilities disclosed in the decrypted report and to compare the summed severity scores to a threshold that represents a maximum tolerable vulnerability severity.

7. The client security module of claim 6, wherein the report validation module is further configured to alert a user if the comparison indicates a severity of vulnerability greater than the threshold.

8. The client security module of claim 1, wherein the report validation module is further configured to count a number of vulnerabilities disclosed in the decrypted report and to compare the number of vulnerabilities to a threshold that represents a maximum tolerable vulnerability count.

9. A client security module, comprising:
  a report validation module configured to acquire a public key associated with a received report, said received report having been generated by a security scan by a server and indicating the presence of one or more vulnerabilities at the server, to decrypt the received report using the public key, and to determine a level of server-side security based on the decrypted report;
  a scanning module configured to scan the server for vulnerabilities based on the received report, wherein the scanning module enhances or diminishes scanning of specific vulnerabilities based on the determined level of server-side security; and
  a processor configured to reconfigure a browser responsive to the determined level of server-side security and an outcome of the scanning module.

10. The client security module of claim 9, wherein the report validation module is further configured to sum severity scores associated with any vulnerabilities disclosed in the decrypted report and to compare the summed severity scores to a threshold that represents a maximum tolerable venerability severity.

11. The client security module of claim 10, wherein the report validation module is further configured to alert a user if the comparison indicates a severity of vulnerability greater than the threshold.

12. The client security module of claim 9, wherein the report validation module is further configured to count a number of vulnerabilities disclosed in the decrypted report and to compare the number of vulnerabilities to a threshold that represents a maximum tolerable vulnerability count.

13. A security verification system, comprising:
  a server security module, comprising:
    a scanner configured to scan a server for one or more vulnerabilities;
    a report generator configured to generate an encrypted report of server-side security based on results provided by said scanner; and
    a transmitter configured to transmit the encrypted report to a requesting client; and
  a client security module, comprising:
    a report validation module configured to decrypt a received report, said received report having been generated at a server, and to determine a level of server-side security based on the decrypted report using a processor; and
    a scanning module configured to scan the server for vulnerabilities, said scanning being configured to enhance or diminish scanning of specific vulnerabilities based on the determined level of server-side security.

14. The security verification system of claim 13, wherein the received report includes an indication regarding the presence of a vulnerability for each of said one or more vulnerabilities at the server.

15. The security verification system of claim 13, wherein the scanning module is further configured to skip scanning of vulnerabilities indicated in the report as not being present at the server.

16. The security verification system of claim 13, wherein the scanning module is further configured to increase scanning of vulnerabilities indicated in the report as being present at the server.

17. The security verification system of claim 13, wherein the report validation module is further configured to sum severity scores associated with any vulnerabilities disclosed in the decrypted report and to compare the summed severity scores to a threshold that represents a maximum tolerable vulnerability severity.

18. The security verification system of claim 17, wherein the report validation module is further configured to alert a user if the comparison indicates a severity of vulnerability greater than the threshold.

19. The security verification system of claim 13, wherein the report validation module is further configured to count a number of vulnerabilities disclosed in the decrypted report and to compare the number of vulnerabilities to a threshold that represents a maximum tolerable vulnerability count.

20. The security verification system of claim 13, wherein the report is encrypted using a private key and decrypted using a public key.

21. A security verification system, comprising:
  a server security module, comprising:
    a scanner configured to scan a server for one or more vulnerabilities;
    a report generator configured to generate a private key encrypted report of server-side security that includes an indication regarding the presence of a vulnerability for each of said one or more vulnerabilities using a processor, and further configured to publish a public key corresponding to the private key; and
    a transmitter configured to transmit the encrypted report to a requesting client, such that the client can access the encrypted report using the public key to determine a level of server-side security; and
  a client security module, comprising:
    a report validation module configured to acquire a public key associated with a received report, said received report having been generated at a server, to decrypt the received report using the public key, and to determine a level of server-side security based on the decrypted report using a processor; and
    a scanning module configured to scan the server for vulnerabilities, said scanning being configured to enhance or diminish scanning of specific vulnerabilities based on the determined level of server-side security.

22. The security verification system of claim 21, wherein the report validation module is further configured to sum severity scores associated with any vulnerabilities disclosed in the decrypted report and to compare the summed severity scores to a threshold that represents a maximum tolerable vulnerability severity.

23. The security verification system of claim 21, wherein the report validation module is further configured to count a number of vulnerabilities disclosed in the decrypted report and to compare the number of vulnerabilities to a threshold that represents a maximum tolerable vulnerability count to determine a level of server-side security.

24. A non-transitory computer readable storage medium comprising a computer readable program for server security verification, wherein the computer readable program when executed on a computer causes the computer to perform the steps of:

acquiring a public key at a client associated with a received report that includes an indication regarding the presence of a vulnerability for each of one or more vulnerabilities, said report having been generated by a security scan by a server;
  decrypting the received report using the public key;
  determining level of server-side security based on the decrypted report using a processor;
  scanning the server for vulnerabilities using a scanning module located at the client; and
  reconfiguring a browser at the client responsive to the determined level of server-side security.

\* \* \* \* \*